United States Patent [19]

Peters

[11] 4,071,357
[45] Jan. 31, 1978

[54] PROCESS FOR RECOVERING ZINC FROM STEEL-MAKING FLUE DUST

[75] Inventor: Mark A. Peters, Arvada, Colo.

[73] Assignee: Hazen Research, Inc., Denver, Colo.

[21] Appl. No.: 725,929

[22] Filed: Sept. 23, 1976

[51] Int. Cl.² ............................................. C22B 19/24
[52] U.S. Cl. ....................................... 75/103; 75/109; 75/117; 75/120; 75/121; 423/105; 423/622
[58] Field of Search .................. 423/105, 622; 75/103, 75/109, 120

[56] References Cited

U.S. PATENT DOCUMENTS

| | | | |
|---|---|---|---|
| 803,472 | 10/1905 | Cunnington | 75/120 X |
| 1,706,143 | 3/1929 | Corbould | 75/120 X |
| 1,780,323 | 11/1930 | Waring | 75/120 X |
| 1,879,834 | 9/1932 | Waring et al. | 75/120 X |
| 2,144,299 | 1/1939 | Sessions et al. | 75/120 X |
| 3,849,121 | 11/1974 | Burrows | 75/103 |

Primary Examiner—G. Ozaki

Attorney, Agent, or Firm—Sheridan, Ross, Fields & McIntosh

[57] ABSTRACT

A method for recovering a substantially impurity-free zinc oxide product from steel-making flue dust or a similar material which comprises leaching the flue dust with concentrated ammonia and carbon dioxide to dissolve zinc and unwanted impurities, cementing the leach filtrate with zinc to remove copper, cadmium, and lead impurities, conducting a steam distillation on the cementation filtrate to precipitate basic zinc carbonate, remove the ammonia and carbon dioxide, and iron impurities, and filtering to provide a residue of essentially basic zinc carbonate, sulfur, and chromium. This residue is then washed to remove soluble sulfates, dried, and calcined at high temperatures to break down the basic zinc carbonate into zinc oxide, water washed to remove chromium and the residue of the water wash dried to produce the desired impurity-free zinc oxide product. The two water washes may be combined into one step performed after the calcining step to remove both sulfur and chromium in one wash step.

5 Claims, 1 Drawing Figure

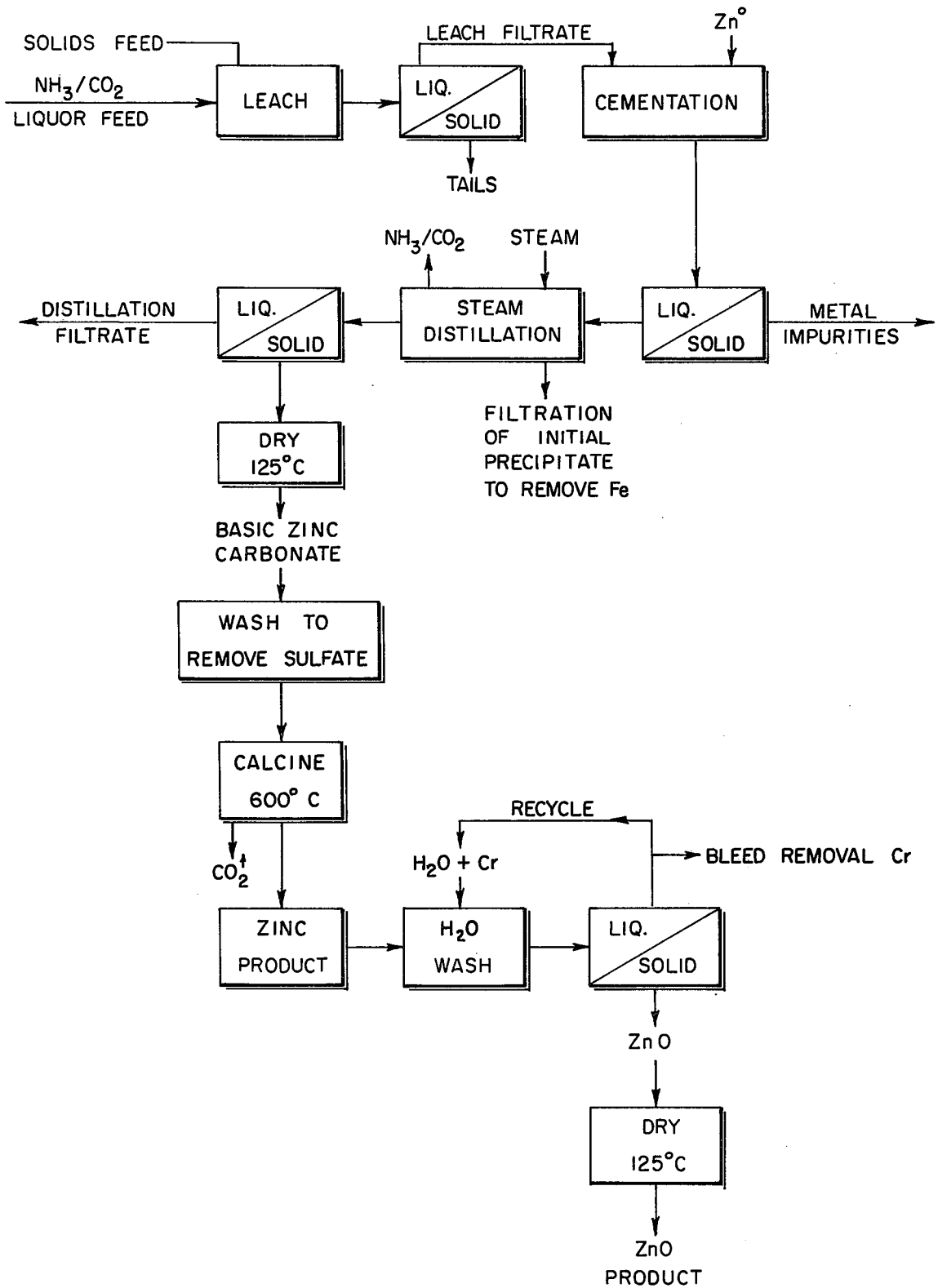

PROCESS FOR RECOVERING ZINC FROM STEEL-MAKING FLUE DUST

BACKGROUND OF THE INVENTION

The invention lies in the field of treating waste materials to recover zinc and other metal values.

Because of the nature of the operation of electric steel furnaces, large amounts of scrap material can be fed into the steel-making process, which was previously impossible, and this is responsible for the large amount of zinc contained in the flue dust from these furnaces. Due to the high proportion of zinc in the dust, it is especially desirable to further refine or treat the dust to remove zinc values from this dust for sale. Naturally, if this dust can be recovered in a simple and relatively inexpensive manner, the commercial value of the zinc obtained would help defray the cost of making steel, and some gain could be recovered from formerly "waste" material.

As is well known in the art, inherent in the process for making steel by use of electric steel furnaces with submerged arcs is the liberation of zinc, iron, and other metal values as flue dust. This "flue dust" is usually relatively high in zinc and iron, and also contains small amounts of copper, cadmium, lead, sulfur, chromium and other metals. Therefore, it is a primary purpose of this invention to recover metal values from this steel-making flue dust, and particularly zinc values, and additionally to provide a means for the separation and recovery of other materials in the dust should this be desirable.

U.S. Pat. No. 2,805,918 to Van Hare, et al., discloses a method for leaching zinc-copper mixtures with an ammoniacal-ammonium carbonate liquor to solubilize the zinc and copper for subsequent separation. Although this patent teaches a method for removing zinc and copper from solution, this process would not be satisfactory for use with flue dust as the initial feed material, since flue dust does not contain only zinc and copper values, but a multitude of other metallic values which must also be removed to provide an essentially pure zinc product. The method disclosed in the patent for removal of zinc is precipitation of the zinc by heating; however, with amounts of lead, nickel, sulfur, chromium, cadmium, and some iron in solution, these values would also be precipitated by heat with a resultant residue of little value because of its impurity. H. M. Lawrence, in *Bull. Am. Zinc. Inst.*, 10, No. 5-6, 107-18 (1927), discloses a process for first leaching a zinc ore with an ammonium carbonate leach, and then cementation with zinc to replace some impurities on the metal sites of the complex with zinc and precipitate impurities; however, Lawrence also was not working with flue dust, which usually contains amounts of iron, chromium and sulfur high enough to render a final product treated by this method hopelessly impure.

"Transactions AIME," *Journal of Metals* (Vol. 180, January 1950), p. 85, discloses a method for steam distilling a pregnant nickel carbonate liquor to remove impurities, including iron, and produce a basic nickel carbonate product, and this procedure, coupled with the product of Lawrence's cementation step, would be a considerable development were nickel and zinc equivalent metals. Obviously, however, one skilled in the art would not equate nickel and zinc in most instances; and even if these references were combined and used to treat flue dust, substantial amounts of sulfur and chromium would still be left in the basic zinc carbonate product of the steam distillation step.

It is obvious, then, from the above information and from the state of the prior art that a method is needed for separating and purifying zinc from steel-making flue dust which can economically remove all of the metallic impurities commonly found in flue dust, as well as result in a substantially pure zinc product.

SUMMARY OF THE INVENTION

The invention lies in a process for recovering a substantially pure zinc product from steel-making flue dust or other comparable waste materials containing impurities, and especially copper, lead, cadmium, iron, sulfur and chromium impurities. This objective is accomplished by leaching the flue dust with concentrated ammonia and carbon dioxide to solubilize a major portion of the zinc in the dust and form a zinc-ammonia-carbonate complex. The product of this leach is then filtered and the solids, which contain zinc ferrite, can either be discarded or processed further with acetic acid to recover some of the zinc from the zinc ferrite in the residue, as is well known in the art. The leach filtrate is then cemented at room temperature with zinc to replace impurities in the complex, such as lead, copper and cadmium with zinc metal.

The cementation filtrate, by this point high in soluble zinc content, is distilled with steam to remove ammonia and carbon dioxide, and precipitate basic zinc carbonate. It has been found that if approximately one percent of the initial precipitate is removed, substantially all of the iron in the cementation filtrate will be "scavenged" by the precipitate and removed. The final steam distillation product is then filtered and the filtrate discarded from the process, resulting in a residue containing primarily basic zinc carbonate with sulfur and chromium impurities.

The residue is dried at approximately 125° C, and then washed to solubilize sulfur compounds in the basic zinc carbonate. The basic zinc carbonate is then calcined at a temperature high enough to break it down into zinc oxide and carbon dioxide. A water wash of the product of this calcining solubilizes chromium compounds, resulting in a zinc oxide product after a final drying at approximately 125° C which is substantially free of impurities. The two water wash steps may be combined into a single step performed after calcining the basic zinc oxide in order to remove both sulfur and chromium impurities in a single step.

BRIEF DESCRIPTION OF THE DRAWING

The single drawing is a flow sheet illustrating the preferred embodiment of the invention.

DESCRIPTION OF THE PREFERRED EMBODIMENT

The preferred embodiment of the invention is illustrated by the flow sheet (FIG. 1). Flue dust contains large amounts of zinc and iron, and smaller percentages of copper, lead, sodium, chromium, nickel, manganese, cadmium and other impurities. Although the dust is fine grained, some clumping occurs when the dust is wetted after being removed from the dust collection system, and these clumps can be broken down to approximately −10 mesh for the best results. This dust is then fed to a leach at room temperature with ammonia and carbon dioxide at high concentration. The duration of the leach should be long enough to solubilize a substantial portion of the zinc in the solids feed. Copper, lead, sulfur, cadmium, chromium, iron and other metal impurities will also be solubilized. It has been found that at least several hours of leaching is necessary to solubilize the zinc, although this time is highly dependent on the mesh size of the initial feed and other factors. The zinc, as well as the other metals, forms a complex like a zinc-ammonia-carbonate complex with the formula $Zn(NH_3)_n CO_3$.

The leach liquor is then filtered to remove the insoluble matter, which has been found to contain predominately zinc ferrite. Some of the zinc can be recovered from the residue by leaching with acetic acid. The leach filtrate from the ammonium carbonate leach is then passed to the cementation step. This step is conducted in accordance with the disclosure of the H. M. Lawrence article (supra). Here, zinc is introduced into the filtrate, which is held at room temperature for several hours throughout the cementation process.

Although the mesh size of the zinc cementation feed is not of major consequence, large chunks of zinc have been found to lengthen the time needed for satisfactory cementation, and a —20 mesh zinc was found to be the preferred size of the zinc fed into the cementation step. The zinc which is introduced into the filtrate replaces metal impurities like copper, cadmium and lead on the ammonium carbonate complex metal sites, and forces these metal impurities out of solution as a precipitate. The cementation product is then filtered and the solids discarded from the process or further processed to recover other metal values. At this point, the cementation filtrate contains a high proportionate amount of zinc and has been purified of virtually all impurities except sulfur, chromium iron and manganese.

The filtrate is then fed to the steam distillation, or "steam stripping" step, and water introduced as steam. The introduction of steam to the system gradually increases the temperature of the solution from room temperature to approximately 80°–90° C. This steam distillation drives off ammonia and carbon dioxide, which can then be recycled to the original leach feed. It has been found that if the steam distillation solution is filtered immediately after the stripping process is begun, when approximately one percent of the total precipitate has settled out of solution, this precipitate will contain essentially all of the iron impurities in the solution. This residue can then be discarded and the steam stripping continued until all of the zinc in solution has been precipitated as basic zinc carbonate. The residue could be further processed to recover additional metal values.

The steam distillation product is then filtered to separate the liquid filtrate from the solid residue composed of basic zinc carbonate and sulfur, chromium, and possible impurities. The residue is dried and washed to remove the water-soluble sulfur compounds. At this point, the basic zinc carbonate residue still contains chromium as an impurity. Substantially all of the other impurities have been removed.

Thus, the only obstacle to obtaining a substantially impurity-free zinc product is the chromium still a part of the residue. It has been discovered that either water washing before calcining or calcining not followed by water washing will not remove chromium from the basic zinc carbonate (see examples 1 and 2). The exact temperature of the required calcine to break down the basic zinc carbonate is unknown; however, a calcine at temperatures of from approximately 200° C up to the sintering point of zinc oxide (approximately 1100° C), succeeds in breaking down the basic zinc carbonate into zinc oxide and, if followed by a water washing the chromium will be removed to leave a high purity, high grade zinc oxide product. This product can then be dried and sold. In the drawing, it is indicated that chromium may be bled off from the wash water to permit recycling of the water. If water is recycled to the wash without this bleed, it will become saturated with chromium which will inhibit the removal of chromium.

The water wash to remove soluble sulfur compounds may be performed before the calcine, or combined with the post-calcine wash to remove chromium, and both of these impurities removed simultaneously.

The following examples and tables are supportive of the process disclosed above, and illustrate the efficiency and completeness of the removal of impurities from the zinc in the flue dust. However, these examples are not to be construed as limiting the invention to the conditions used therein. It is, obviously, well within the spirit, scope and intent of this invention to vary temperatures or processing times slightly, or to use this process in connection with various other purification steps well known in the art, or to apply this process to material other than steel-making flue dust which has the same basic components.

EXAMPLE 1

A —10 mesh, 106 lb. sample of steel-making flue dust was leached at room temperature for 4 hours with 106 liters of 87 g/l ammonia and 85 g/l carbon dioxide. An analysis of the solids feed by weight percent, as well as the results of further treatment of this dust, is contained in Table I below. An analysis of the residue obtained from this leaching shows a 54.7% extraction of zinc from the solids feed, a 6.7% removal of iron, a 4.7% lead extraction, 43.4% cadmium removal, and smaller percentages of other impurities removed. This residue was then discarded.

The filtrate from the leach was passed to cementation at room temperature for 2 hours, with the addition of 2.84 g/l —20 mesh Zn° dust (five times stoichiometric), with the results again displayed in Table I. Of note is the high efficiency of copper, lead, cadmium, and iron removal by this step. This residue was also discarded, with the filtrate being steam distilled and the initial precipitate, which contained virtually all of the iron impurities in the feed solution, being discarded. Table I shows an analysis of the filtrate of this initial filtration step. This steam stripping was then run to completion. The sample was then split into two equal portions, with Sample 1 left untreated further. Sample 1 from this example was used as the feed material for Example 2. Sample 2 was then calcined at 600° C and analyzed as shown in the last line of Table I. This final product was then used as the feed material for Example 3.

It can be seen from this example that efficient removal of most of the impurities contained in the initial flue dust feed has been effected by the process of the invention. However, the final product of this run, even after the 600° C calcine, still contained amounts of chromium and sulfur large enough to keep the product from being saleable. Also of importance is the weight percentage of zinc in the final zinc oxide product, 73.2%, while a pure zinc oxide product will contain 80.3 zinc. The product of this process, without further treatment, would be of little commercial value because of its impurity.

TABLE I

Recovery of ZnO from Steel Furnace Flue Dust

| Unit Process and Data Description | Zn | Pb | Cu | Cd | Fe | Mn | Cr | Ni | S |
|---|---|---|---|---|---|---|---|---|---|
| $NH_3 + CO_2$ Leaching | | | | | | | | | |
| Solids, Feed, Wt. % | 22.7 | 4.41 | 0.27 | 0.095 | 28.1 | 3.38 | 0.146 | — | 0.76 |
| Residue, Wt. % | 12.8 | 5.42 | 0.27 | 0.07 | 34.0 | 4.11 | — | — | — |
| % Removed | 54.7 | 4.7 | 23.0 | 43.4 | 6.7 | 6.1 | — | — | — |
| Zn Cementation | | | | | | | | | |
| Feed Leach Liquor, g/l | 53.8 | 0.58 | 0.22 | 0.20 | 0.082 | 0.014 | 0.20 | — | — |
| Product Filtrate, g/l | 54.9 | 0.005 | <0.001 | 0.010 | 0.047 | 0.013 | 0.18 | — | — |
| % Removal | — | 99.1 | >99.5 | 45.0 | 42.8 | ≈0 | — | — | — |
| Steam Stripping | | | | | | | | | |
| Feed Liquor, g/l | 54.9 | 0.005 | <0.001 | 0.010 | 0.047 | 0.013 | 0.18 | — | — |
| Filtrate After Initial Filtration, g/l | 52.6 | 0.005 | 0.001 | 0.02 | 0.004 | 0.01 | 0.11 | — | — |
| Primary Filtrate Plus Wash, g/l | ·4.3 | 0.002 | <0.001 | <0.001 | <0.001 | <0.001 | 0.02 | — | — |
| Dry Residue at 125° C and Divide into Samples No. 1 and No. 2 | | | | | | | | | |
| Sample No. 1, Wt. % | 52.6 | — | — | — | — | — | 0.09 | — | 0.63 |
| Sample No. 2 After Calcining at 600° C without Wash, Wt. % | 73.2 | 0.009 | <0.001 | 0.018 | ≈0.09 | 0.016 | 0.12 | 0.001 | 0.83 |

EXAMPLE 2

Sample No. 1 from Example 1 was washed four times for this example, with the results depicted in Table II below. Virtually all of the sulfur in the sample was removed by the washes, thus demonstrating the effectiveness of the water wash to remove sulfur as soluble sulfate after the steam distillation step; however, in this example as well as in Example 1, the zinc purity is not commercially acceptable due to chromium contamination of the product.

TABLE II

Water Wash of Sample No. 1

| Sample Description | Wt/Vol. g/ml | Analyses | | | | | |
|---|---|---|---|---|---|---|---|
| | | Cr | S | Zn | Fe | Pb | Mn |
| Feed, Sample No. 1 from Table I | 20.0g | 0.09 % | 0.63% | 52.6% | — | — | — |
| 1st Filtrate | 52 ml | 0.005 g/l | — | — | — | — | — |
| 2nd Filtrate | 75 ml | 0.002 g/l | — | — | — | — | — |
| 3rd Filtrate | 81 ml | 0.001 g/l | — | — | — | — | — |
| 4th Filtrate | 157 ml | 0.0002 g/l | — | — | — | — | — |
| Product, Basic Zinc Carbonate After Drying | — | 0.096 % | 0.06% | 59.6% | — | — | — |

EXAMPLE 3

Sample No. 2 from Example 1 was water washed four times for this example, just as in Example 2. The analyses of the filtrates are shown in Table 3 below. However, as noted in the description of Example 1, this feed material was first calcined to 600° C before washing. The results of this wash show an excellent removal of impurities, including chromium (which was reduced to 0.007 weight percent of the final product). It is the calcining at high temperature, followed by water washing, which removes chromium, as clearly demonstrated by the results shown by these tables and examples, and any omission of either of these steps, or a reversal in the order thereof, produces an unusable, impure product. As can be seen from Table III, the purity of the zinc oxide product from this example was superlative; 80.2 weight percent zinc of a possible 80.3 weight percent was obtained.

TABLE III

Water Wash of Sample No. 2 (After 600° C Calcine)

| Sample Description | Wt/Vol. g/ml | Analyses | | | | | |
|---|---|---|---|---|---|---|---|
| | | Cr | S | Zn | Fe | Pb | Mn |
| Feed, Sample No. 2 from Table I | 20.0g | .12 % | .83% | 73.2% | ≈.09 | .009% | .016% |
| 1st Filtrate | 68 ml | .316 g/l | — | — | — | — | — |
| 2nd Filtrate | 105 ml | .054 g/l | — | — | — | — | — |
| 3rd Filtrate | 93 ml | .008 g/l | — | — | — | — | — |
| 4th Filtate | 160 ml | .0008 g/l | — | — | — | — | — |
| Product, ZnO After Drying | — | .007 % | .03% | 80.2% | .071% | .007% | .010% |

It is seen from the Description of the Preferred Embodiment above, from the examples, and from the tables and flow sheet illustrating the process of the invention, that a new and useful invention has been made for purifying the zinc contained in steel-making flue dust, or other similar material, and that this invention fulfills all of the conditions and objectives hereinabove set forth as a desirable and commercially feasible means for recovering zinc from flue dust.

What is claimed is:

1. A process for recovering metal values from a steel-making flue dust containing zinc, iron, lead, copper, chromium and cadmium as impurities comprising:
   a. leaching the feed material with ammonia and carbon dioxide in high concentration and filtering to produce a leach residue and a filtrate containing zinc values and the impurities;

b. cementing the leach filtrate from step (a) with zinc to remove lead, copper and cadmium and performing a liquid/solids separation on the resulting slurry;

c. steam distilling the cementation filtrate from step (b) to precipitate basic zinc carbonate;

d. performing an initial liquid/solids separation on the steam distillation slurry of step (c) immediately after steam distillation has begun to scavenge out the iron content of the slurry and then continuing the steam distillation until all of the zinc has precipitated as zinc carbonate;

e. calcining the zinc carbonate precipitate of step (d) at a temperature between 200° C–1100° C to convert the zinc carbonate to zinc oxide; and f. washing the zinc oxide product of step (e) in water to remove sulfate and chromium converted to the soluble form by the calcination of step (e).

2. The process of claim 1 in which in step (d) the initial filtration step is performed when approximately one percent of the total precipitate has been formed.

3. The process of claim 1 in which the zinc carbonate precipitate of step (d) is washed with water to remove sulfate before calcining.

4. In the process for recovering zinc from metal impurities with which it is associated by dissolving the zinc and metal impurities in ammonium carbonate followed by precipitating the zinc as zinc carbonate by steam distillation, the improvement which comprises immediately filtering the steam distillation slurry after steam distillation has begun to scavenge out the iron content of the slurry.

5. In the process of producing zinc oxide from zinc carbonate by calcination, the improvement for producing a chromium-free zinc oxide which comprises calcining the zinc carbonate at a temperature between 200° C–1100° C and washing the formed zinc oxide product in water.

* * * * *